March 15, 1966 J. F. DEWALD ETAL 3,241,009

MULTIPLE RESISTANCE SEMICONDUCTOR ELEMENTS

Filed Nov. 6, 1961 6 Sheets-Sheet 1

INVENTORS: J. F. DEWALD
W. R. NORTHOVER
A. D. PEARSON

BY [signature]

ATTORNEY

INVENTORS: J. F. DEWALD
W. R. NORTHOVER
A. D. PEARSON
BY Peter V. D. Wilde
ATTORNEY INVENTORS: J. F. DEWALD
W. R. NORTHOVER
A. D. PEARSON
BY Peter V. D. Wilde
ATTORNEY

MULTIPLE RESISTANCE SEMICONDUCTOR ELEMENTS

Filed Nov. 6, 1961 6 Sheets-Sheet 4

INVENTORS J. F. DEWALD
W. R. NORTHOVER
A. D. PEARSON
BY [signature]
ATTORNEY

INVENTORS J. F. DEWALD
W. R. NORTHOVER
A. D. PEARSON
BY [signature]
ATTORNEY

MULTIPLE RESISTANCE SEMICONDUCTOR ELEMENTS

Filed Nov. 6, 1961 6 Sheets-Sheet 6

INVENTORS J. F. DEWALD
W. R. NORTHOVER
A. D. PEARSON
BY
ATTORNEY

United States Patent Office 3,241,009

Patented Mar. 15, 1966

3,241,009

MULTIPLE RESISTANCE SEMICONDUCTOR ELEMENTS

Jacob F. Dewald, Meadham, William R. Northover, Westfield, and Arthur D. Pearson, Bernardsville, N.J., assignors to Bell Telephone Laboratories, Incorporated, New York, N.Y., a corporation of New York Filed Nov. 6, 1961, Ser. No. 150,374

14 Claims. (Cl. 317—234)

This invention relates to novel electrical elements and devices capable of performing unexpected and highly significant electrical functions. More specifically, it concerns active electrical elements composed of materials possessed of electrical characteristics of which the art was previously unaware. Such elements are capable of performing a multitude of electrical functions and have been found suitable for use in switches, oscillators, amplifiers, memory elements and various other solid state electronic devices.

Current semiconductor devices, particularly transistors, are ordinarily constructed primarily of crystalline semiconductors, most notably silicon and germanium.

It has now been found that a different class of materials exhibits highly unexpected electrical phenomena and such materials are thus adapted for many of the applications now served by crystalline semiconductor devices. This new class of materials is defined as glassy, single-phase, multicomponent, compositions within a specified electronic conductivity range.

The glassy materials which exhibit the general electrical and thermal characteristics which form a principal basis for this invention are distinguished by their semiconducting properties as hereafter specifically prescribed and by their atomic form. A glass, within the context of this description, is intended to define a supercooled liquid having a viscosity in excess of $10^8$ poise.

The specific characteristic which constitutes an essential electrical phenomenon of this invention is the presence of a multiply-unstable current-voltage characteristic, including a region of negative resistance. While many former crystalline semiconductor systems have shown negative resistance regions, these have uniformly shown I–V characteristics which were single valued in either the current or the voltage. In other words, their electrical properties can be completely expressed by a single curve on a current-voltage plot. However, in the present system the I–V curves are at least double valued in both current and voltage, and experimental investigations indicate that additional states exist. Such multiple-valued I–V characteristics make possible a variety of completely novel electrical functions. Since, in addition, it is possible to suppress one or more of the instabilities, the present system can also be utilized for the many device applications based upon bistable and negative resistance elements which are known and well established in the art.

The presence of the multivalued current-voltage characteristic in the materials of these glass systems is believed to be due to the fact that at least one component of such compositions readily exhibits at least two stable valence states. All semiconducting glasses necessarily possess this distinguishing feature.

The particular systems and compositions exhibiting these useful and unexpected properties, which are intended as within the scope of this invention, are defined as semiconducting glasses within the electron conductivity range $10^{-2}$ to $10^{-8}$ ohm$^{-1}$ cm.$^{-1}$.

The following specific description and embodiments will perhaps be more easily understood when considered in conjunction with the drawing in which.

Figure 1A:
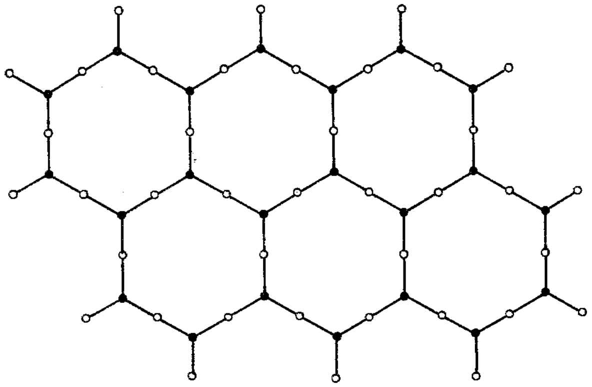
FIG. 1A is a schematic 2-dimensional representation of the atomic structure of a crystalline substance illustrating the high degree of atomic order characteristic of crystalline materials.
Figure 1B:
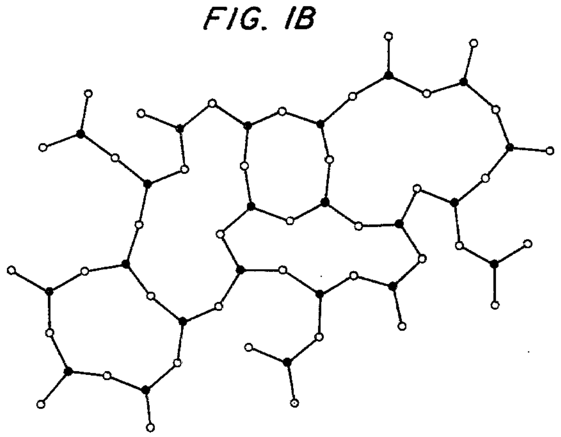
FIG. 1B is a representation similar to FIG. 1A, showing the atomic structure of a glassy substance and depicting the random nature of the atomic structure.

FIGS. 1A and 1B illustrate the definition of glassy materials in terms of their atomic structure. FIG. 1A is a structural diagram showing the complete ordering of the substance $X_2O_3$ where X is an appropriate cation. FIG. 1B is a diagram of the atomic order of a glassy structure for the same substance $X_2O_3$. Note that although each atom of a given kind has the same number of nearest neighbors as in the crystalline array, the glassy material is devoid of long range ordering (i.e., shows no regular overall pattern).

Thus, the glassy materials which are intended as within the scope of this invention may also be defined as those which exhibit only short-range (primarily nearest-neighbor) ordering. This definition precludes true crystalline substances which are the semiconductor materials commonly used in active electronic devices.

An additional limitation on the materials intended as within the scope of this invention is the conductivity value which the material exhibits under the prospective operating conditions. It has been found that glasses having electrical conductivities within the range $10^{-2}$ to $10^{-8}$ ohm$^{-1}$ cm.$^{-1}$ exhibit the electrical phenomena associated with this invention. In establishing this conductivity range it is essential to point out that this limitation refers to electronic conductivity, as distinguished from the total conductivity of the material which may also include ionic contributions.

For the specific embodiments described hereinafter all the conductivity values considered were room temperature conductivities. However, since these materials typically exhibit conductivity variations with temperature, a material having a room temperature conductivity below the prescribed critical range may in fact be quite useful in applications which contemplate operation at elevated temperatures. Thus, the prescribed critical range is not necessarily to be considered as a room temperature conductivity but rather as a limitation on the material of the device under the actual anticipated conditions of operation.

All of the glass compositions tested which fall within the conductivity range previously prescribed were found to exhibit current-voltage characteristics which are multiple-valued in both current and voltage. Exemplary of the glass systems which, within the specified conductivity range, will provide this result are the following systems:

Arsenic-tellurium-iodine
Arsenic-tellurium-bromine
Arsenic-tellurium-selenium
Arsenic-thallium-selenium
Vanadium-oxygen-phosphorus
Vanadium-oxygen-phosphorus-lead
Vanadium-oxygen-phosphorus-barium
Sodium-boron-titanium-oxygen.

Those familiar with the chemistry of glass systems are aware that all compositions within a ternary or quaternary system do not necessarily form glasses. Thus, to achieve the desired characteristics with glass compositions according to this invention, it is essential to:

(1) Select a composition which forms a glassy body as previously defined with sufficient viscosity to permit effective use in the contemplated device application. This viscosity will, of course, vary with the temperature of operation and the specific requirements on the device. All of the compositions set forth in the examples which follow provide true glass compositions having external semblance of solidity at ordinary device operating temperatures.

(2) Select a composition within the prescribed conductivity range.

To illustrate the electrical behavior of these glasses specific compositions within each system listed above were prepared in accordance with the following general procedure.

Starting materials for the preparation of these glasses were of high purity, in most cases in a convenient elemental form. Samples were prepared in clear fused quartz vials having the approximate dimensions of 5/16" I.D. and 6" long. The weights of the elements required to form a product of a given composition were calculated such that the product would just fill a bulb at the bottom of the vial. The required quantities were weighed out in a dry nitrogen atmosphere and transferred to the quartz vial. The vial was then evacuated and sealed with a hydrogen torch. The sealed quartz vial was then placed inside a steel bomb with loosely fitting but securely fixed end caps. The bomb was then heated in a horizontal furnace having a combustion tube which rotated about its own axis during the firing. After the reaction, the bomb and its contents were allowed to cool in a vertical position so that the majority of the product would solidify in the bulb at the bottom of the vial. After cooling, the vial was removed from the steel bomb and small quantities of materials which had condensed in the upper portion of the tube were forced down into the bulb by heating the tube with a hydrogen torch. The tube was then heated with a small hydrogen flame at a point just above the bulb until it collapsed and sealed. The tube above the collapsed portion was then drawn off and the section of the vial containing the product was then reheated in the steel bomb in the rotating tube furnace. After firing, the bomb and its contents were allowed to air-cool to room temperature.

This sealed vial preparation technique avoids loss of volatile components and insures a product of composition corresponding to the weights of the reactants used. Variations in composition between the surface of the product and its bulk were minimized by making sure that the volume of the final product would as nearly as possible fill the quartz bulb, thus allowing only a very small free volume into which evaporation of volatile constituents could take place.

For the system AsTeI, which forms a preferred species of this invention, the composition range over which glasses form was determined by preparing samples of random proportions and then examining them. A material was considered to be a glass if it satisfied the following criteria:

(1) Existence of a single phase.

(2) Gradual softening and subsequent melting, with increasing temperature, rather than sharp melting characteristic of crystalline materials.

(3) Conchoidal fracture.

(4) Absence of crystalline X-ray diffraction peaks.

Figure 2:
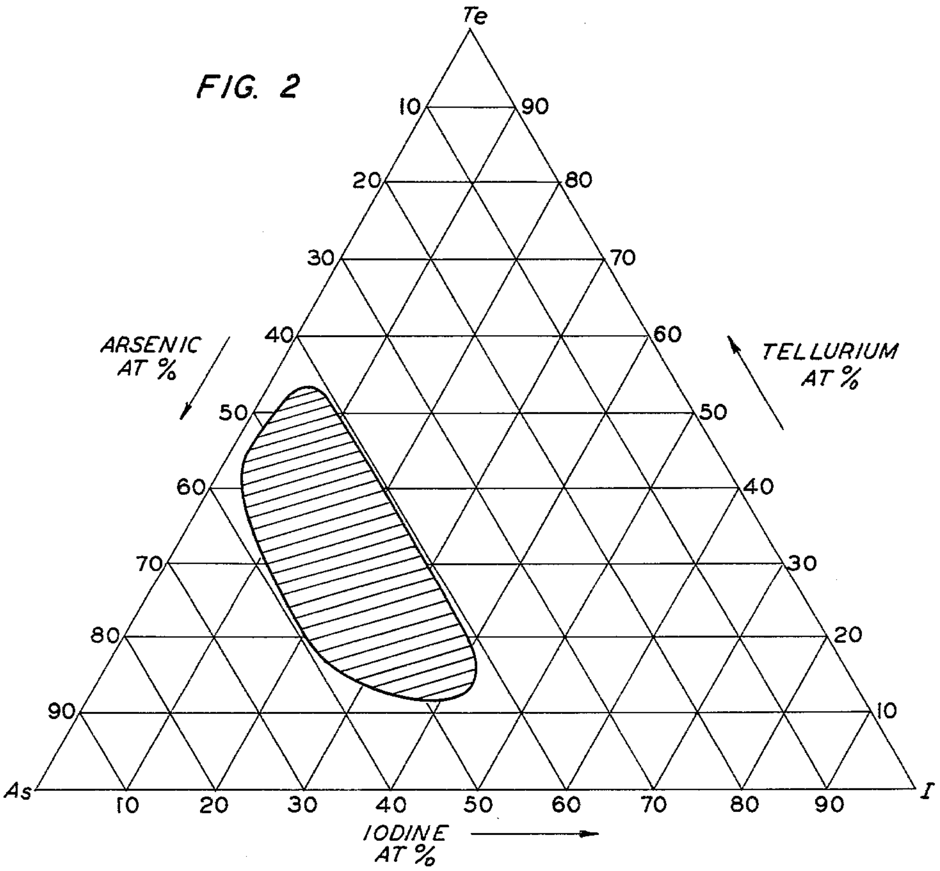
FIG. 2 is a ternary diagram of a glass system found suitable for the purposes of this invention.

The sample compositions thus classified were used in drawing the ternary phase diagram of FIG. 2. The shaded area indicates those compositions which readily form glasses.

The following examples are directed to specific compositions exhibiting the desired electrical properties which are set forth in greater detail hereinafter. The glasses of Examples 1–5 and 9 were prepared according to the above-prescribed technique using the indicated amounts of the materials specified. The remaining glasses were prepared using a simple fusion technique as indicated. An appropriate temperature and duration for the heating step is particularly set forth. Each composition given in mol percent forms a glass meeting the essential requisites prescribed for the materials within the scope of this invention.

EXAMPLE I

The glass formed in this example was 46% As, 16% Te, 38% I and was made by heating 11.61 gms. of metallic arsenic, 6.59 gms. of metallic tellurium and 16.06 gms. of resublimed iodine at 600° C. for 55 minutes.

EXAMPLE II

The glass of this example was 43% As, 28% Te, 29% I formed by heating 7.96 gms. metallic arsenic, 9.11 gms. metallic tellurium and 9.20 gms. resublimed iodine at 600° C. for 70 minutes.

EXAMPLE III

In this example the glass was 53% As, 43% Te, 4% I made by heating 9.93 gms. metallic arsenic, 13.72 gms. metallic tellurium and 1.27 gms. resublimed iodine at 600° C. for 60 minutes.

EXAMPLE IV

The glass of this example was 40% As, 48% Te, 12% Se made by heating 80 mol percent $As_2Te_3$ and 20 mol percent $As_2Se_3$ to give 10 gms. total at 600° C. for 60 minutes.

EXAMPLE V

The glass in this example was 30% As, 27.5% T1, 42.5% Se made by heating 4 gms. of arsenic, 10 gms. of thallium and 6 gms. of selenium at 600° C. for 60 minutes.

EXAMPLE VI

The glass of this example was 25.0% V, 71.5% O, 3.5% P made by heating 9 gms. $V_2O_5$ and 1 gm. $P_2O_5$ heated in a fused silica tube with a hydrogen torch for 5 minutes until thoroughly fused.

EXAMPLE VII

The glass in this example was 24.5% V, 71.0% O, 3.4% P, 1.0% Pb made by heating 8.3 gms. $V_2O_5$, 0.9 gm. $P_2O_5$ and 0.8 gm. PbO in a fused silica tube with a hydrogen torch for 5 minutes until thoroughly fused.

EXAMPLE VIII

The glass in this example was 24.4% V, 70.8% O, 3.4% P, 1.4% Ba made by heating 8.3 gms. $V_2O_5$, 0.9 gm. $P_2O_5$ and 0.8 gm. BaO in a fused silica tube with a hydrogen torch for 5 minutes until thoroughly fused.

EXAMPLE IX

The glass in this example was 53% As, 43% Te, 4% Br made by heating 3.95 gms. arsenic, 5.52 gms. tellurium and 0.31 gm. bromine at 600° C. for 60 minutes.

EXAMPLE X

The glass in this example was 20.8% Na, 18.5% B, 9.0% Ti, 51.7% O prepared by heating 1 gm. $B_2O_3$ (hydrated) to fusion until no further bubbles evolved, adding 1.5 gms. $Na_2CO_3$ and 0.87 gm. $Ti_2O_3$ and heating for 5 minutes with hydrogen torch until thoroughly fused.

Figure 3A:
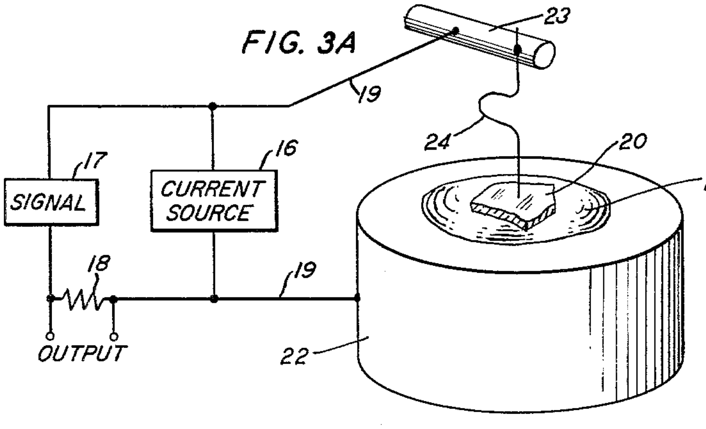
FIG. 3A is a perspective view of an electrical element according to this invention.
Figure 3B:
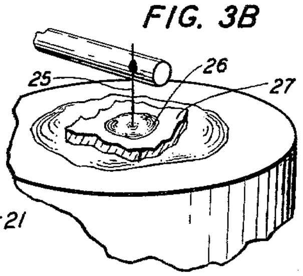
FIG. 3B is a perspective view of the contact portions of FIG. 3A showing an appropriate area contact arrangement.
Figure 4:
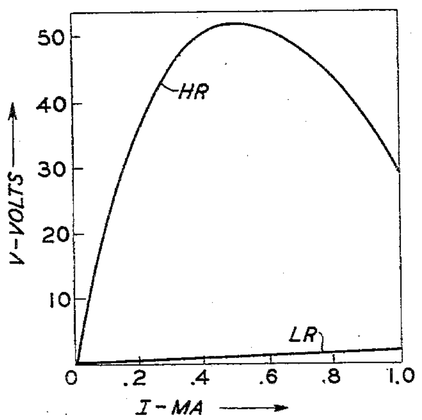
FIG. 4 is a plot of current vs. voltage showing the electrical behavior of one composition according to this invention, specifically 46% As, 16% Te, 38% I.
Figure 5:
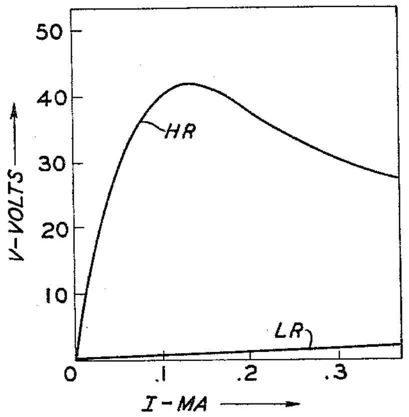
FIG. 5 is a plot of another composition, 43% As, 28% Te, 29% I.
Figure 7:
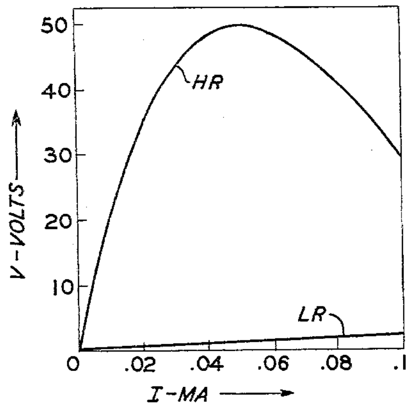
FIG. 7 is a similar I–V characteristic for the composition 40% As, 48% Te, 12% Se.
Figure 8:
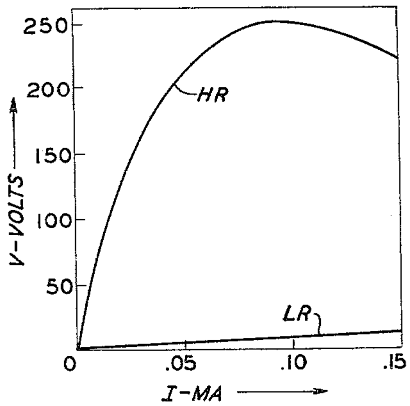
FIG. 8 is an I–V characteristic for the composition 30%, As, 27.5% Tl, 42.5% Se.

The electrical characteristics of samples prepared in accordance with each of Examples I–X were measured using the means illustrated in FIG. 3A and FIG. 3B. FIG. 3A shows the glass sample 20 resting in a pool of indium-gallium alloy 21 atop a brass base member 22. The alloy pool was used to insure proper contact between the base member and the sample. A conductive pin 23 holds the point contact 24 in contact with the glass sample. The point contact with a 5 mil tungsten wire having a hemispherical point on a reduced portion with a diameter of 0.5 mil. The point contact may alternatively be platinum or phosphorus-bronze or any conductive, high-melting metal. Although the data presented was obtained using point contacts, completely similar effects have been observed with broad-area contacts. If a broad-area contact is desired, evaporated gold contacts or indium dots may be used which are conventional in the art. For experimental purposes a wire immersed in a drop of indium-gallium alloy placed atop the sample provided an adequate broad-area contact of the order of 60 mils diameter. This arrangement is illustrated in FIG. 3B wherein a conductive wire 25 is shown contacting an alloy pool 26 atop the sample 27. The device is otherwise identical to that of FIG. 3A.

Prior to obtaining the indicated multivalued current-voltage characteristic, it was generally found necessary to "form" the diode. Electrical "forming" of point contact devices is well established, particularly in transistor technology. The resultant electrical contact is often referred to as "non-ohmic" which means a contact which provides a non-linear current-voltage characteristic.

An illustrative example of "forming" in the present case consists of gradually increasing the current through the device, and then decreasing it slowly. This process is repeated, progressively raising the value of the highest current, until upon subsequent gradual reduction of the current, the characteristic is approximately that of a simple resistor. The current is then increased again to values in excess of 20 milliamperes and abruptly removed. If the formation is complete the low signal resistance of the device will have increased many fold over its value just before the abrupt current removal. In a typical sample, that of Example III, two such cycles (to 8 ma. and then to 16 ma.) achieved the desired multi-state operation.

Specific current-voltage characteristics which are obtainable with the materials of Examples I–X according to the procedure outlined above are presented in FIGS. 4–13 of the drawing. Each of the FIGS. 4–13 corresponds to characteristics obtained with the materials of the respective Examples I–X. Each figure shows 2 curves, a high resistance curve designated "HR" terminating into a negative resistance portion, and a second, low resistance curve designated "LR" in each instance. Note that these materials exhibit similar electrical behavior. Typical data which have been obtained in the foregoing investigations are tabulated in Table I.

The peak voltage values can be varied over a considerable range by slight variations in sample treatment and the precise values quoted in Table I are not to be construed as necessarily unalterable properties of the material alone.

*Table I*

| Exam. | System | Composition (mol percent) | Conductivity ($ohm^{-1}$-$cm.^{-1}$) | Vp* |
|---|---|---|---|---|
| I | AsTeI | 46[As]16[Te]38[I] | $10^{-8}$ | 52 |
| II | AsTeI | 43[As]28[Te]29[I] | $4 \cdot 10^{-6}$ | 40 |
| III | AsTeI | 53[As]43[Te]4[I] | $3 \cdot 10^{-4}$ | 10 |
| IV | AsTeSe | 40[As]48[Te]12[Se] | $6 \cdot 10^{-6}$ | 50 |
| V | AsTlSe | 30[As]27[Tl]43[Se] | $3 \cdot 10^{-8}$ | 250 |
| VI | VOP | 25.0[V]71.5[O]3.5[P] | $5 \cdot 10^{-4}$ | 5 |
| VII | VOPPb | 24.6[V]71.0[O]3.4[P]1.0[Pb] | $5 \cdot 10^{-4}$ | 65 |
| VIII | VOPBa | 24.4[V]70.8[O]3.4[P]1.4[Ba] | $10^{-4}$ | 100 |
| IX | AsTeBr | 53[As]43[Te]4[Br] | $3 \cdot 10^{-4}$ | 30 |
| X | NaBTiO | 20.8[Na]18.5[B]9.0[Ti]51.7[O] | $10^{-2}$ | 55 |

*Peak voltage (volts).

The unexpected existence of two resistance states in these glass materials and an attendant negative resistance capability will suggest many device applications to those skilled in the art.

Various specific applications of particular interest, which are by no means exhaustive or limiting, are specifically presented in the following description.

A primary application for electronic devices is in the field of switching. Devices of this invention are capable of high-speed switching over a significant useful load range. The switching behavior of diodes constructed according to this invention was investigated using a diode fabricated of the material of Example III and connected in the circuit of FIG. 14.

Figure 6:
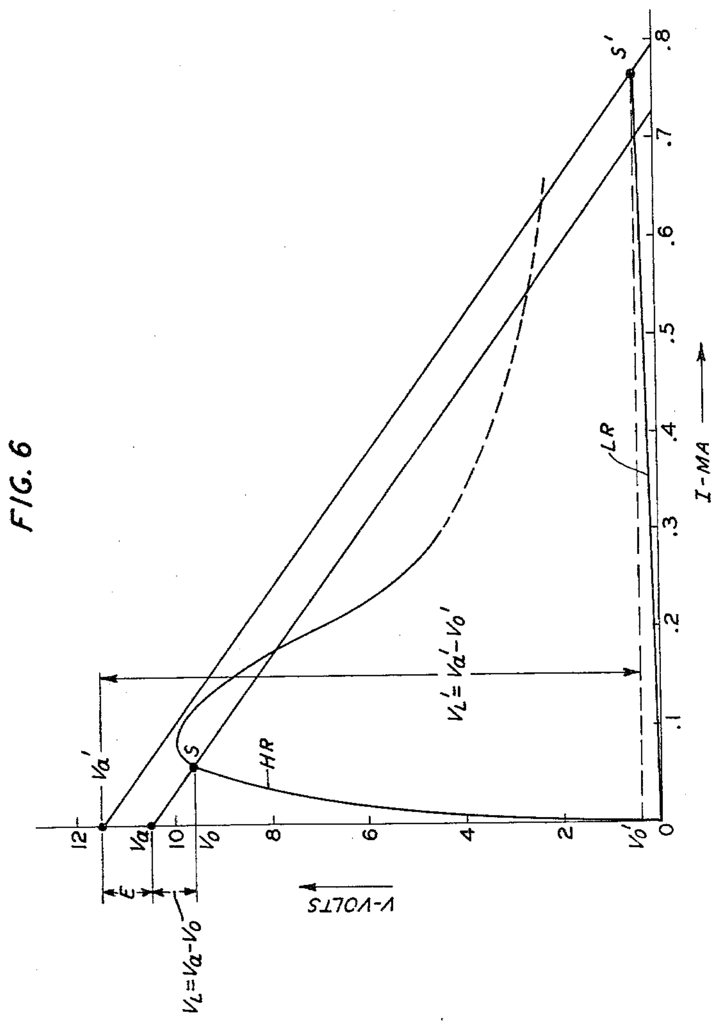
FIG. 6 is a plot of the same nature of that of FIG. 4 showing the I–V characteristic for the composition 53% As, 43% Te, 4% I.
Figure 9:
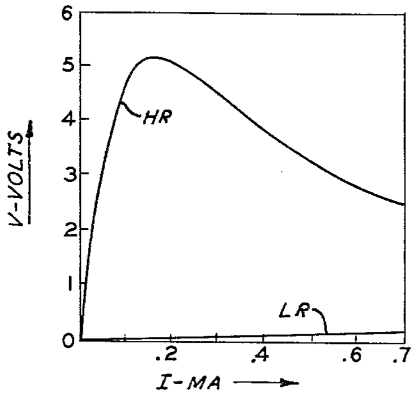
FIG. 9 is an I–V characteristic for the composition 25.0% V, 71.5% O, 3.5% P.
Figure 10:
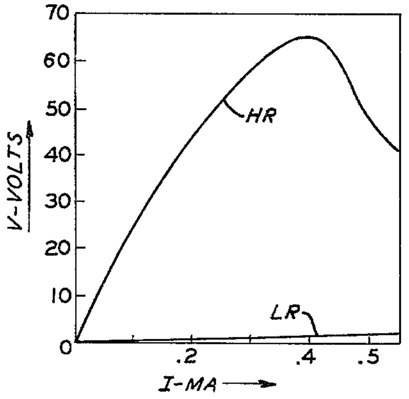
FIG. 10 is an I–V characteristic for the composition 24.5% V, 71.0% O, 3.4% P, 1.0% Pb.
Figure 11:
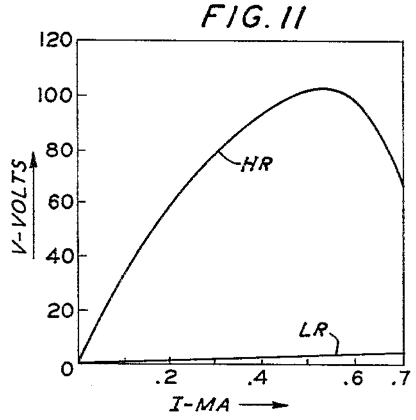
FIG. 11 is an I–V characteristic for the composition 24.4% V, 70.8% O, 3.4% P, 1.4% Ba.
Figure 12:
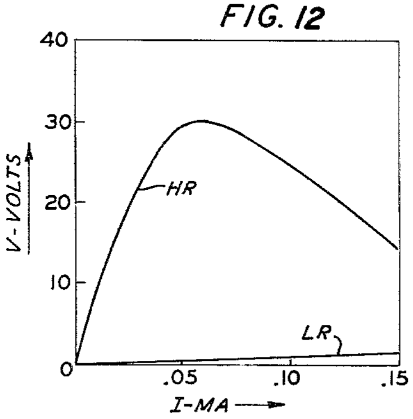
FIG. 12 is an I–V characteristic for the composition 53% As, 43% Te, 4% Br.
Figure 13:
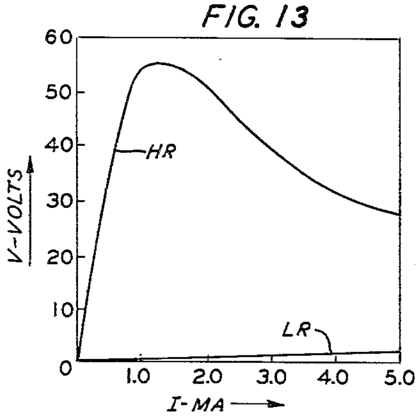
FIG. 13 is an I–V characteristic for the composition 20.8% Na, 18.5% B, 9.0% Ti, 51.7% O.
Figure 14:
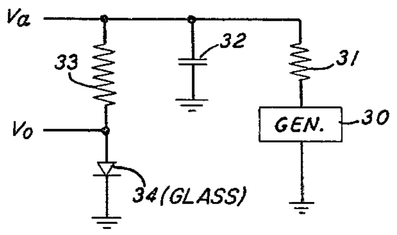
FIG. 14 is a circuit diagram used for evaluating the switching behavior of electrical devices constructed with the glass materials of this invention.
Figure 15A:
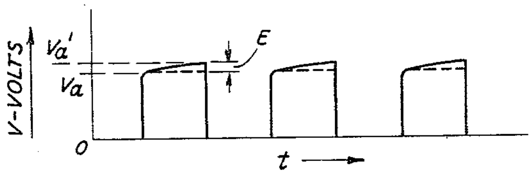
FIGS. 15A and 15B are voltage-time graphs obtained with the circuit shown in FIG. 14 showing the switching behavior of a diode constructed according to this invention.
Figure 15B:
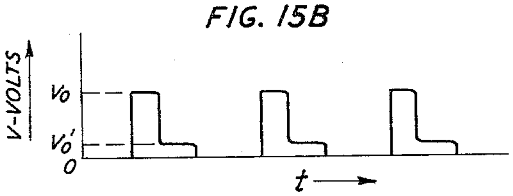

The circuit of FIG. 14 consists of square wave generator 30, resistor 31, capacitor 32, load 33, and a glass diode according to this invention 34, of the general construction shown in FIG. 3, all connected as shown. The diode, capacitor and generator were grounded. For the data presented herein the square wave generator produced a 10 kc. signal with an amplitude of 18 volts. The resistor 31 had a value of 1000 ohms, the capacitance of element 32 was 500 $\mu\mu f$, and the load resistance was 20,000 ohms. The voltage ($V_a$ of FIG. 14) across the diode 34 and load 33 is shown in FIG. 15A as a function of time, and the voltage drop across the diode ($V_o$ of FIG. 14) is shown in FIG. 15B. The time (abscissa) axes in the figures are equivalent. Because of the capacitance in the circuit, the applied voltage varied during the "on" half-cycle from $V_a$ to $V_a+E$ at the peak of the signal. The voltage increase E was in effect the pulse which activated the switch from the high resistance to the low resistance state as is seen from the plot of FIG. 15B. The abrupt decrease in current at the end of the half cycle caused the switching action from low back to high resistance. Typical switching points for this particular diode are shown as points S and S' in FIG. 6 at the intersection of the indicated load lines with the high resistance and low resistance curves. The switching voltage E of FIG. 15A is shown in FIG. 6 as the increment between $V_a$ and $V_a'$. The load voltages $V_o$ and $V_o'$ of FIG. 15B are shown also in FIG. 6. The time within the half-cycle at which the diode switches can be determined from FIGS. 4–13 as the point at which the voltage across the diode exceeds the peak voltage. The complete switching process was observed to occur in less than 1 microsecond.

It is significant to point out that switching elements of this invention show a unique and significant advantage in their operation over that of conventional switching elements. Prior art elements typically require a continual bias to preserve their low resistance. Upon removal of the bias the elements consistently return to the high resistance condition. The devices of this invention can be made to preserve their "on" condition even at zero bias so long as the current is not abruptly decreased. For instance, with the material of Example III operating at 5 milliamperes it has generally been found that removal of the bias within a period of less than $\frac{1}{10}$ second, that is, at least 50 ma./sec. causes the diode to switch to the high resistance condition. Rates of current decrease of less than 5 milliamperes/second will generally insure that the device remain in the low resistance state. The high resistance performance has no such limitation. To date no limit on the effective storage time in an unbiased state has been found. Periods of several days and, perhaps significantly longer, appear to be easily realized.

The presence of a negative resistance region in the I–V characteristic of the materials of this invention establishes, almost by definition their utility in solid-state electronic amplifiers and oscillators.

Specifically, an exemplary amplifier device could advantageously employ the material of Example III. A suitable device construction is shown in FIG. 3A and FIG. 3B. The leads 19 are attached to a stabilization source 16 of a design well known in the art for biasing the device in the negative resistance region of FIG. 6. The signal to be amplified 17 is also injected across leads 19 and the output is obtained across load 18.

Whereas for each particular device described herein the physical construction of FIG. 3 is satisfactory, elements produced commercially may take many forms. Typically, the device might be encapsulated in a manner similar to present diodes and transistors. The specific design will depend somewhat on the prospective application.

Figure 16:
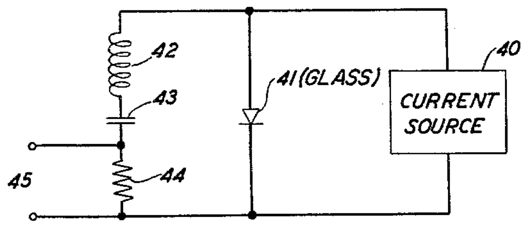
FIG. 16 is a circuit diagram for an oscillator constructed according to this invention.

A circuit arrangement for a two-terminal oscillator constructed according to this invention is shown in FIG. 16. This figure shows a constant current source 40 connected across the diode 41, which may be constructed as in FIG. 3. A conventional LC circuit consisting of inductor 42, capacitor 43 and resistor 44 is connected as shown with the output indicated at 45. Using a diode constructed of the material of Example III, a constant current source, an inductance of .03 henry, a capacitance of 24,000 $\mu\mu$f. and a resistance of 100,000 ohms, 13 kc. oscillations were obtained with amplitudes up to 4 volts, at currents of about 100 ma.

Devices constructed according to the teachings of this invention also provide novel and useful memory elements.

Figure 17:
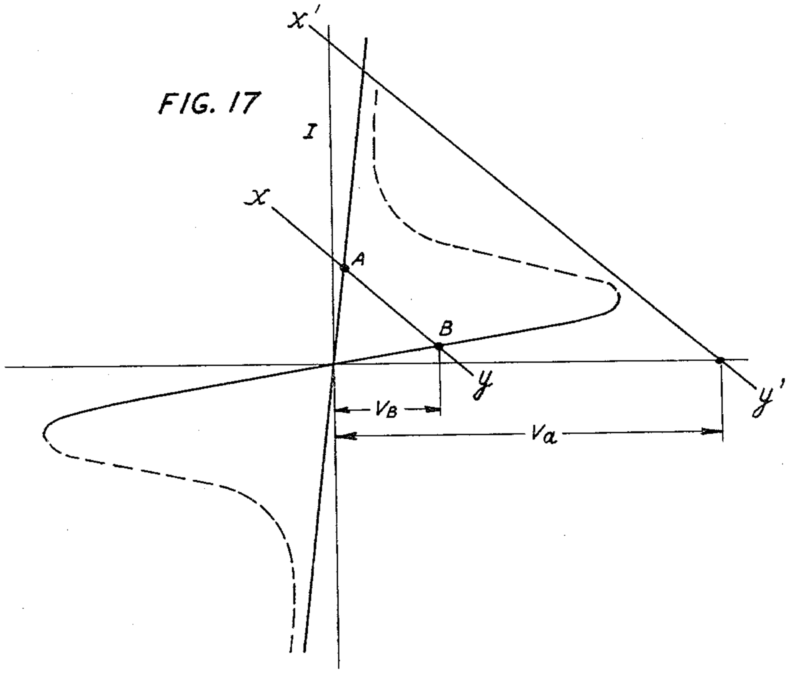
FIG. 17 is a current-voltage characteristic typical of the materials of this invention illustrating schematically appropriate operating points for memory or logic circuit applications.

Typical conventional prior art memory devices switch from a high resistance state to a low resistance state with an appropriate intelligence voltage pulse. Until the bias is reversed or essentially removed, the device remains in the low resistance state. Such devices can also be constructed with the materials of this invention. Exemplary, and with reference to FIG. 17, a D.C. bias is applied having a load line *x–y* which intersects the low and high resistance lines of the device characteristic at points A and B, respectively. Consider the device to be initially at point B. Now if a voltage pulse greater than $(V_a-V_B)$ is applied, the device switches to point A. In order to switch back to point B a negative pulse of magnitude slightly less than $(V_a+V_B)$ is applied. This causes large negative current to flow through the device, the abrupt decrease in current causing the system to switch back to point B. Pulses of the same magnitude, and of opposite polarity to those described (in each case) will not cause transitions between A and B.

Whereas reference was made herein to a material exhibiting two resistance states, this reference is intended to define at least two necessary states. Certain of these materials have in fact been observed in resistance states additional to those indicated. Various device applications may also be predicated on these additional states while still being within the scope of the appended claims. Also, rectifying effects have been observed and devices based upon these effects are intended as within the scope of this invention.

Various other modifications will become apparent to those skilled in the art. All such deviations which basically rely on the principles through which this disclosure has advanced the art are properly considered within the scope of this invention.

What is claimed is:

1. An electrical component capable of operating in two resistance states comprising a glass body having an electronic resistivity within the range $10^2$ to $10^8$ ohm-cm. and having electrical means for impressing an electric signal on said body, said glass comprising means responsive to voltage signals of a minimum value for changing the resistance state of said body from a first discrete high resistance state to a second discrete low resistance state and said means being further responsive to the rate of decrease of the value of the voltage signals to revert said body to the high resistance state when the rate of decrease of the voltage signal exceeds a given rate and to maintain said body in the low resistance state when the rate of decrease of the voltage signal is less than the given rate.

2. The element of claim 1 wherein the said body comprises a glass in the system As–Te–I.

3. The element of claim 1 wherein the said body comprises a glass in the system As–Te–Se.

4. The element of claim 1 wherein the said body comprises a glass in the system As–Tl–Se.

5. The element of claim 1 wherein the said body comprises a glass in the system V–O–P.

6. The element of claim 1 wherein the said body comprises a glass in the system V–O–Pb.

7. The element of claim 1 wherein the said body comprises a glass in the system As–Te–Br.

8. The element of claim 1 wherein the said body comprises a glass in the system Na–B–Ti–O.

9. The element of claim 1 wherein the electrical means includes a point contact.

10. The element of claim 1 wherein the electrical means includes a broad area contact.

11. An electrical component comprising a glass body having an electronic resistivity in the range $10^2$ to $10^8$ ohm-cm. and having electrical means for impressing an electric signal on said body, said glass comprising means responsive to switching signals of a minimum value for changing the resistance state of said body from a first discrete high resistance state, through a negative resistance condition, to a second discrete low resistance state.

12. An electrical component consisting essentially of a glass body having an electronic resistivity within the range $10^2$ to $10^8$ ohm-cm., and electrical means for making a nonohmic contact to said glass body, said component having a current-voltage characteristic which includes a negative resistance region, electrical D.C. means for biasing the component at a point in the current voltage characteristic approximating the negative resistance region whereby an oscillating signal output is obtained.

13. An electrical component consisting essentially of a glass body having an electronic resistivity within the range $10^2$ to $10^8$ ohm-cm. and electrical means for making a nonohmic contact to the glass body, said component having a current voltage characteristic which includes a negative resistance region, electrical means for biasing the component at a point in the current voltage characteristic near the negative resistance region and electrical means for impressing an A.C. signal across the biased component to obtain an amplified output signal.

14. An electrical element comprising a glass body having an electronic resistivity within the range $10^2$ to $10^8$ ohm-cm. and having electrical means for impressing an electric signal on said body, said glass exhibiting at least two stable resistance states for a given single-value bias condition.

References Cited by the Examiner

UNITED STATES PATENTS

| | | | |
|---|---|---|---|
| 2,469,569 | 5/1949 | Ohl | 331—107 |
| 2,590,893 | 4/1952 | Sanborn | 252—62.3 |
| 2,641,705 | 6/1953 | Hussey | 331—107 |
| 2,718,616 | 9/1955 | Conrad | 317—235 |
| 2,728,881 | 12/1955 | Jacobi | 317—235 |
| 2,821,490 | 1/1958 | Dunegan | 317—237 |
| 2,829,321 | 4/1958 | Kopelmam | 317—237 |
| 2,961,350 | 11/1960 | Flaschen et al. | 106—47 |
| 3,033,714 | 5/1962 | Ezaki et al. | 317—235 |
| 3,058,009 | 10/1962 | Shockley | 307—88.5 |
| 3,062,971 | 11/1962 | Wallace | 307—88.5 |
| 3,117,013 | 1/1964 | Northover et al. | 106—47 |

OTHER REFERENCES

"Glass Formation and Properties of Glasses in the System $Na_2O$—$B_2O_3$—$SiO_2$—$TiO_2$" by Geiss et al.; July 1, 1958 issue of Journal of the American Ceramic Society, pp. 231–237.

"Semiconducting Properties of Some Vanadate Glasses" by Baynton et al. found in pp. 237–240 of the April 1957 edition of the "Journal of the Electro Chemical Society."

JOHN W. HUCKERT, *Primary Examiner.*

JOHN KOMINSKI, JAMES D. KALLAM, *Examiners.*